United States Patent [19]

Hunting et al.

[11] 3,919,461

[45] Nov. 11, 1975

[54] DATA TRANSMISSION SYSTEM

[75] Inventors: Robert A. Hunting, Phoenix; Bradford O. Van Ness, Paradise Valley, both of Ariz.

[73] Assignee: Engineered Systems, Inc., Tempe, Ariz.

[22] Filed: Jan. 7, 1974

[21] Appl. No.: 431,472

[52] U.S. Cl. .......... 178/2 R; 340/147 LP; 340/346

[51] Int. Cl.[2] .......... H04Q 5/00

[58] Field of Search .......... 340/346, 147 LP, 147 R, 340/345; 178/2 R, 2 C, 2 E, 3, 4.1 R

[56] References Cited

UNITED STATES PATENTS

| | | | |
|---|---|---|---|
| 3,179,747 | 4/1965 | Grace et al. | 340/346 X |
| 3,202,841 | 8/1965 | Kunzke | 340/147 LP |
| 3,832,689 | 8/1974 | Means et al. | 340/147 LP |

*Primary Examiner*—Thomas A. Robinson
*Attorney, Agent, or Firm*—LaValle D. Ptak

[57] ABSTRACT

In order to couple a plurality of data transmitting terminals to a data receiving device via a single transmission channel, the high side of the transmission line pair is biased through a resistor to the mark level such that an output transistor switch within each terminal disposed across the transmission line pair can force the space level by being switched to the "on" condition, thereby shorting the transmission line pair. At the inception of a contention period, all terminals are permitted to issue data to the line. However, any terminal attempting to place a mark on the line while any other terminal is placing a space will fail since the space is dominant. The marking terminal drops from contention, and the process continues until a single terminal remains active to complete its message transfer. Thereafter, another contention cycle is instituted and resolved.

8 Claims, 2 Drawing Figures

DATA TRANSMISSION SYSTEM

Figure 1:
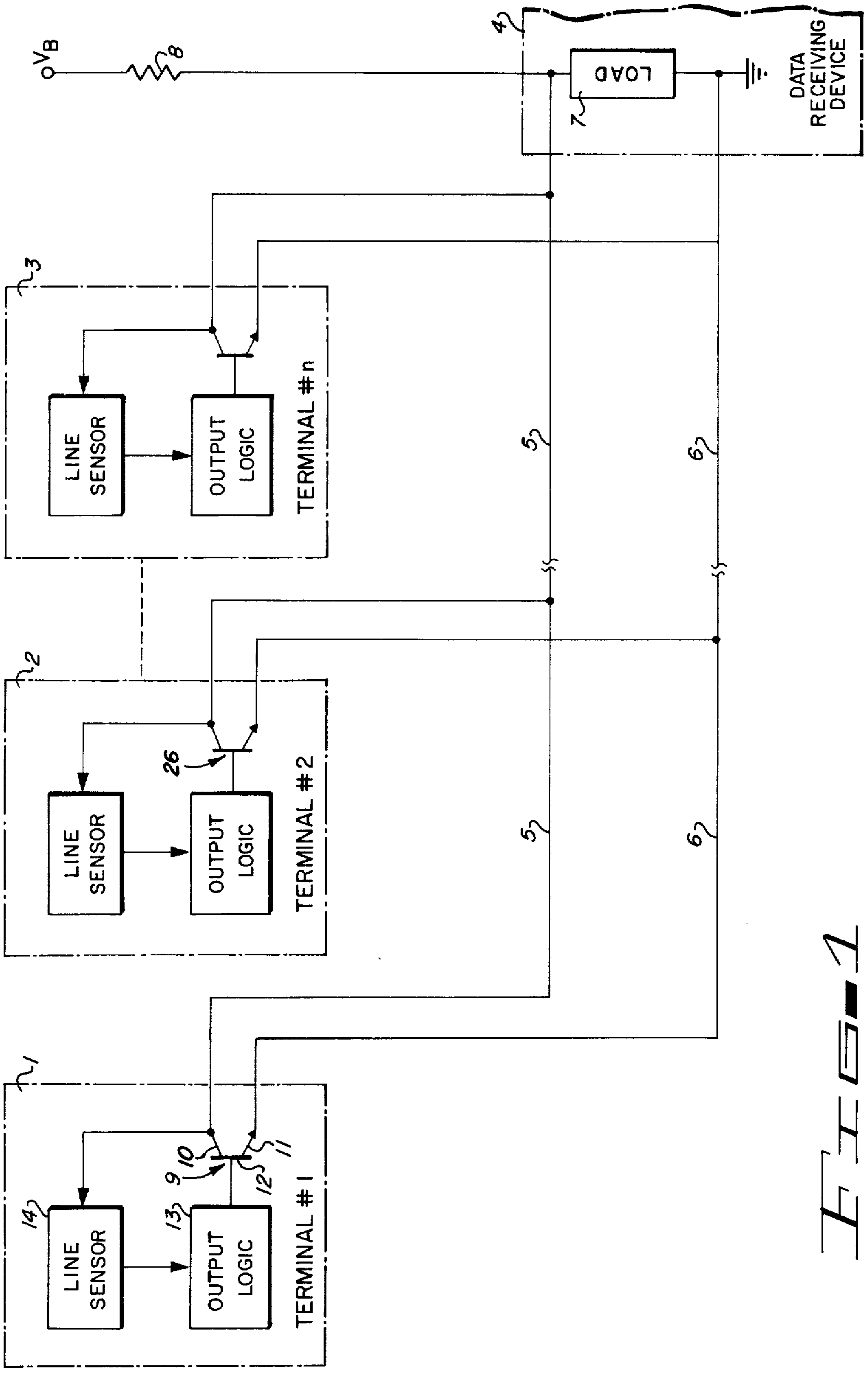

This invention relates to data communication and, more particularly, to a method and apparatus for effecting data transmission to a central device from a plurality of data terminals via a common transmission line.

In prior art systems, employing a plurality of data terminals coupled by a common bus to a data receiving device, it has been necessary to provide intermediate apparatus to interrogate, multiplex or otherwise monitor and control the data terminals in order to prevent two or more terminals from simultaneously impressing different data on the bus.

Various approaches have been formulated to minimize the line control apparatus. A promising example is the "line contention" technique in which each terminal monitors the presence or absence of data on the common bus. As long as data is present on the bus, no terminal, other than the one from which the currently transferred data originates, impresses data on the bus. However, after a sensed absence of data on the bus for a predetermined period, each terminal prepared to transmit data to the receiving device is permitted to attempt to seize the bus. The first terminal to issue data is successful in acquiring control of the bus and proceeds to transmit its information to the receiving device. The other ready terminals must await the completion of the current transmission for another chance at seizing the line.

Despite the attractive theoretical simplicity of contention systems, previous attempts toward achieving a practical realization have failed because of the manifest possibility that two or more terminals would seek access to the line simultaneously.

Various efforts to solve the simultaneity problem characteristic of a basic contention system have met with little success. For example, offsetting the terminal frequencies limits the total number of terminals which can be accommodated. Another approach has been to limit the overlapping contention system to just a few microseconds on the basis that simultaneity will seldom, if ever, occur within such a short time period. However, it has been found that the attainable contention or uncertainty period is directly related to the time constant or capacitance of the line pair constituting the transmission bus and cannot be made sufficiently short to be effective.

Thus, those skilled in the art will appreciate the desirability of achieving a simple contention system in which mutual interference among the terminals is completely eliminated.

It is therefore a broad object of our invention to provide improved means for coupling a plurality of data sources to a single data receiver via a single transmission channel.

It is another broad object of our invention to provide such means which employs a contention method.

In another aspect, it is still another object of our invention to provide simple apparatus for practicing our invention.

It is a more specific object of our invention to provide a method and apparatus for practicing the method whereby contending terminals do not mutually interfere with each other.

These and other objects of the invention are accomplished by biasing the high side of the transmission line to the mark level through a resistor and providing an output stage in each terminal disposed as a switch across the line. Thus, any terminal can force the line to the space level (Ov) by turning on its output stage, and the space condition is therefore dominant. As a result, when a plurality of terminals simultaneously attempt to seize the line, the data receiver will experience no difficulty as long as the mark - space pattern from the terminals is identical. However, if any terminal is asserting a space, a line sensor in the marking terminal will detect that the line is in a space condition rather than the desired mark condition. The marking terminal then ceases transmission and waits for the line to become free again. Very quickly, a single terminal will dominate and complete its transmission, after which another contention period is initiated and resolved.

Figure 2:
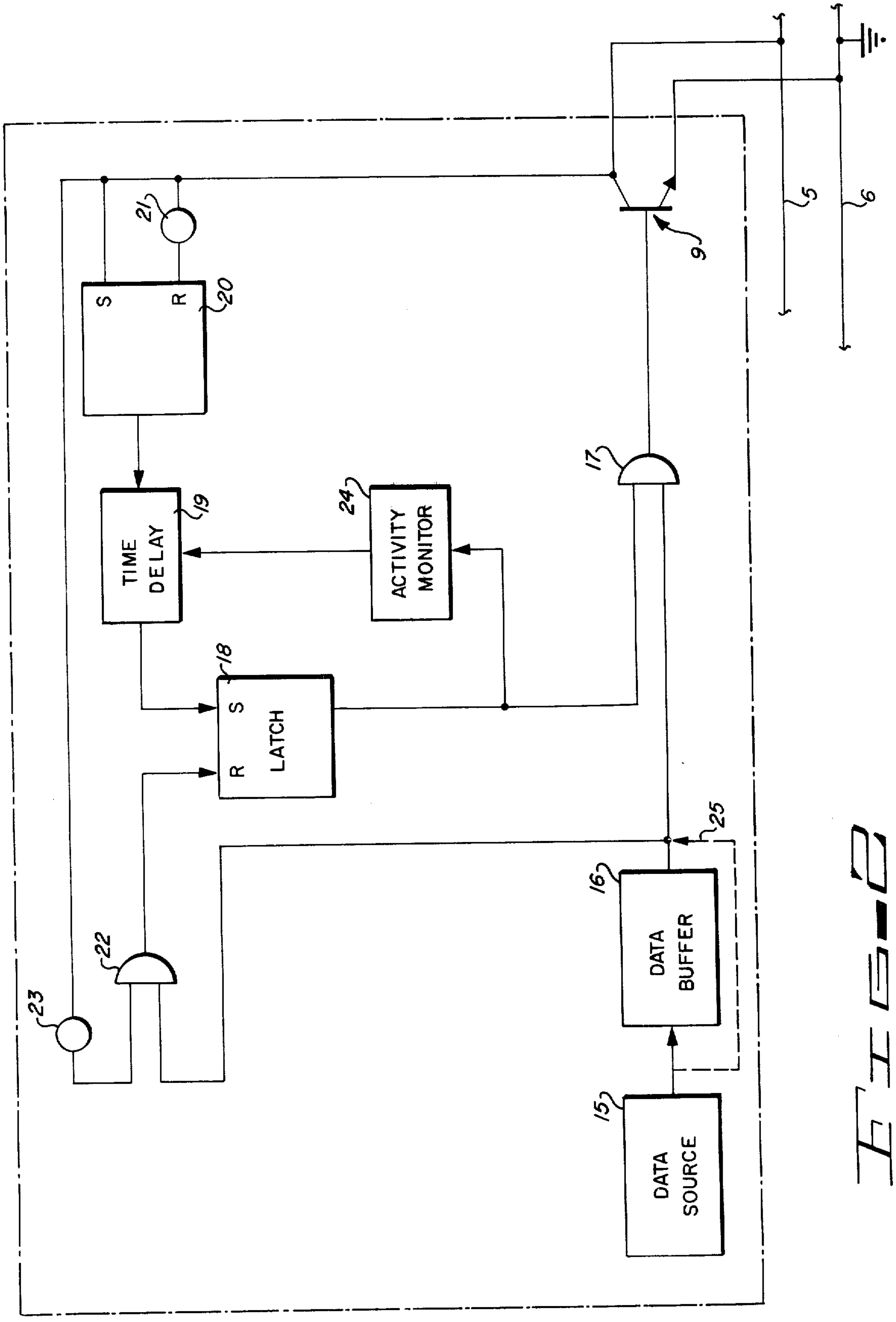

The subject matter of the invention is particularly pointed out and claimed in the concluding portion of the specification. The invention, however, both as to organization and method of operation, may best be understood by reference to the following detailed description taken with reference to the accompanying drawing, of which:

FIG. 1 is a simplified schematic representation of a data gathering system employing the present invention; and FIG. 2 is a block and logic diagram of a terminal within the system of FIG. 1.

Attention is now directed to FIG. 1 in which it will be observed that a plurality of data transmitting terminals 1, 2, 3 are coupled to a data receiving device 4 via a single transmission bus comprising a high line 5 and a reference line 6. The line data sensing element within the data receiving device 4 is depicted as a load 7 disposed across the line pair 5 and 6. A resistor 8 is connected between a voltage source $V_B$ and the high line 5 in order to bias the transmission bus to a first predetermined level (mark) when no current path except the load 7 exists between the line pair 5 and 6. Aa second predetermined transmission bus level (space) is defined by placing a short across the line pair 5 and 6.

Those skilled in the art will understand that digital communication may be carried out by transmitting information as a series of marks and spaces. In the system of FIG. 1, the load 7 will observe a mark unless one or more of the terminals 1, 2, 3 places a space on the transmission bus. Referring to an exemplary data terminal 1, it will be noted that an output transistor 9 has its collector electrode 10 connected to the high line 5 and its emitter electrode 11 connected to the reference line 6. Thus, according to the signals appllied by the output logic 13 to the base electrode 12 of the transistor 9, the terminal 1 will either place a short across the line pair 5 and 6 (transistor 9 on) or will not affect the line pair (transistor 9 off). These two conditions represent attempts by the terminal 1 to place space and mark conditions, respectively, onto the transmission bus. Inherent in the system, any attempt to place a space onto the line will be successful. On the other hand, an attempt by the terminal 1 to impress a mark onto the transmission line will be successful only if all other terminals operating in the transmit mode are simultaneously attempting to send a mark. If another terminal, such as terminal 2, issues a space (output transistor 26 on) while terminal 1 issues a mark, only the space condition will appear on the transmission line.

The difference between the information which the terminal 1 is attempting to transmit and the information observed on the transmission line is detected by the line sensor 14 and output logic 13 which simply aborts further transfer of data from the terminal 1 to the transmission bus. Ultimately, only one terminal remains in the transmit mode and, at the time that terminal predominates, the message portion already transmitted to the data receiving device 4 must accord exactly with the corresponding message portion issued by the dominant terminal. When a complete message has been sent, the high line 5 returns to a steady state mark condition because of the influence of the bias circuit. The line sensor 14 of the terminal 1 and the corresponding line sensors of all other terminals respond to the steady state mark condition by initiating a new contention period during which some single terminal will predominate to send its complete message to the data receiving device.

Attention is now directed to FIG. 2 which is a simplified block and logic diagram illustrating an exemplary configuration for terminal 1. A complete message is transferred from a data source block 15 to a data buffer 16 which can serially issue the data in a non-destructive manner. The serial output from data buffer 16 is applied as an input to an AND-gate 17. Alternatively, the data buffer 16 can be omitted and data source 15 can be employed which continuously repeats its complete message until the message transfer has been completed. This embodiment is indicated by the dashed line 25. The output of AND-gate 17 is coupled to the base electrode of output transistor 9 which, if gate 17 is enabled, switches in accordance with the message to impress a corresponding series of marks and spaces onto line pair 5 and 6. Gate 17 is enabled or disabled according to the state of latch flip-flop 18. The latch flip-flop is set by an output logic level change from a time delay circuit 19. A set input to a line monitor flip-flop 20 is connected to the high line 5, and a reset input is coupled to the line 5 through an inverter 21. The time delay circuit 19, which may be a monostable multivibrator or functional equivalent, is actuated by the set condition of the line monitor flip-flop 20 and aborted by the reset condition. Thus, when the flip-flop 20 is set by the line 5 changing to the mark level and this condition continues (as when the line is clear) for a predetermined period, the time delay circuit 19 sets the latch flip-flop 18 to enable the AND-gate 17. If the line is not clear, a space in the message clears the line monitor flip-flop 20 to abort the transmit enable process in the terminal 1.

Assuming that the latch 18 has been set during the initial stage of a contention period, all terminals so enabled will commence to issue data from their respective data buffers 16 (recirculating or otherwise saving the data in the process). Referring specifically to the terminal 1 and FIG. 2, the data from buffer 16 is applied to one input of an AND-gate 22. The level appearing on the high line 5 is inverted through inverter 23 and applied to a second input to AND-gate 22. Thus, AND-gate 22 will be enabled if the terminal 1 is attempting to issue a mark while any other terminal forces a space condition across the line pair 5, 6.

The output from AND-gate 22 is connected to a reset input of latch 18 which will therefore be reset if the above-noted signal difference is detected. Resetting latch 18 results in disabling the AND-gate 17 to inhibit further transmission by the terminal 1 until the latch 18 is again set to authorize the beginning of another contention/transmit cycle. By a similar process, other terminals are eliminated in the contention until a single dominant terminal remains to complete its message transfer.

It is sometimes useful to rearrange the priorities of obtaining service by adjusting time constants within the time delay circuits so that any terminal having completed a transmission will have to wait for a longer than normal period before seeking access to the line again. This adjustment can be carried out by monitoring the state of latch flip-flop 18 with activity monitor 24 which may be a resettable monostable multivibrator or the functional equivalent. If the latch 18 remains set for a sufficient period to indicate that the terminal 1 has acquired the line, the activity monitor 24 issues a signal to the time delay circuit 19 to extend its time constant by, for example, switching in different value components in the usual manner.

Those skilled in the art will understand that the logic configuration illustrated in FIG. 2 is merely exemplary. The functions of each of the several elements can be carried out in practic by various alternative means which are particularly adapted for specific operating conditions and for incorporation within systems carrying design constraints such as different or inverted signal levels to represent, respectively, the mark and space conditions. Of course, a simple rearrangement of the apparatus and conventions can be effected to make the mark condition dominant.

Further, in the interest of clarity, no attempt has been made to resolve potential logic races and similar conditions which can require auxiliary logic within practical system embodiments. All such variations, adaptations and extensions are readily within the skill of the artisan and, since not essential to an understanding of the invention, are therefore not considered in detail.

We claim:

1. In a data communication system comprising a plurality of data transmitting terminals coupled to a data receiving device via a single communication channel in a mark/space level format, the method of selecting a single one of the terminals for communicating a message to the data receiving device comprising the steps of:

a. establishing simultaneous access by a plurality of the terminals to the communications channel;
b. comparing, in each terminal, the level which that terminal attempts to impress on the communications channel and the actual level appearing on the communications channel; and
c. aborting data transmission from each terminal in which a no-compare condition is detected.

2. The method of claim 1 which includes the step of establishing a dominant level which the communications channel will accept from one or more terminals independent of simultaneous attempts by one or more additional terminals to impress the other level thereon.

3. The method of claim 2 in which the dominant level is nominally zero volts.

4. The method of claim 3 in which any terminal may issue a dominant level by effectively shorting a line pair constituting the transmission channel.

5. Apparatus for controlling data communication to a data receiving device from a plurality of data terminals via a single line pair communications channel in a mark/space level format, comprising:

a. means for biasing a first line of said line pair to a first level;

b. means for clamping a second line of said line pair to a second level;

c. switch means in each of said terminals electrically disposed across said line pair such that closure of any one or more switches forces said first line to said second level;

d. comparator means in each of said terminals for comparing the state of said switch means in that said terminal to the level on said first line; and e. abort means in each of said terminals responsive to said comparator means for disabling that said terminal from further data transmission.

6. The apparatus of claim 5 which further includes line sensor means in each of said terminals, said line sensor means being responsive to said first line remaining at said first level for a predetermined period by enabling said terminal to transmit data.

7. The apparatus of claim 6 in which each of said switch means comprises an output transistor adapted to be switched between on and off states to, respectively, short said line pair and have no effect on said line pair.

8. The apparatus of claim 7 in which said biasing means comprises a resistor connected between a voltage source and said first line whereby the full voltage from said source is dropped across said resistor when at least one of said output transistors is on.

* * * * *